United States Patent [19]
Brogardh

[11] 4,270,050
[45] May 26, 1981

[54] APPARATUS FOR MEASURING PRESSURE BY ABSORPTION SPECTRUM CHANGE

[75] Inventor: Torgny Brogardh, Vesteras, Sweden

[73] Assignee: ASEA Aktiebolag, Vesteras, Sweden

[21] Appl. No.: 73,191

[22] Filed: Sep. 7, 1979

[30] Foreign Application Priority Data

Sep. 15, 1978 [SE] Sweden ................. 7809710

[51] Int. Cl.³ .................................. G01D 5/34
[52] U.S. Cl. ..................... 250/231 R; 73/777; 73/800; 356/32
[58] Field of Search ............. 250/226, 227, 231 R; 73/762, 763, 777, 800; 356/32, 33, 34, 35

[56] References Cited
U.S. PATENT DOCUMENTS 3,462,223  8/1969  Tiemann et al. ............... 356/32
3,578,864  5/1971  Ross ................................ 73/777
4,147,977  4/1979  Dimmick ..................... 250/231 R Primary Examiner—David C. Nelms
Attorney, Agent, or Firm—Watson, Cole, Grindle & Watson

[57] ABSTRACT

A fiber optical measuring device for measuring physical magnitudes comprises a transducer having a body constituting an optical modulator. The optical properties of the modulator are dependent on the mechanical forces acting on the modulator. The optical property utilized is the pressure dependency of at least one light-absorption edge of the absorption spectrum of the modulator material. Optical fibers are used for leading light into the modulator and for leading out light that has passed through the modulator.

15 Claims, 17 Drawing Figures

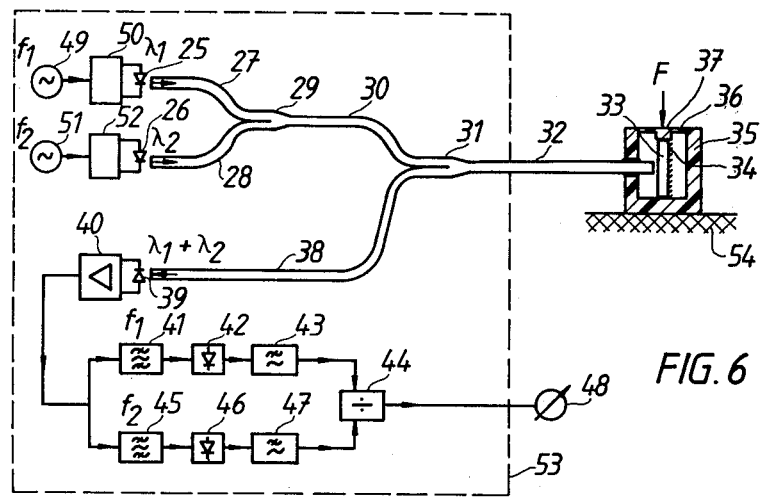
FIG. 6
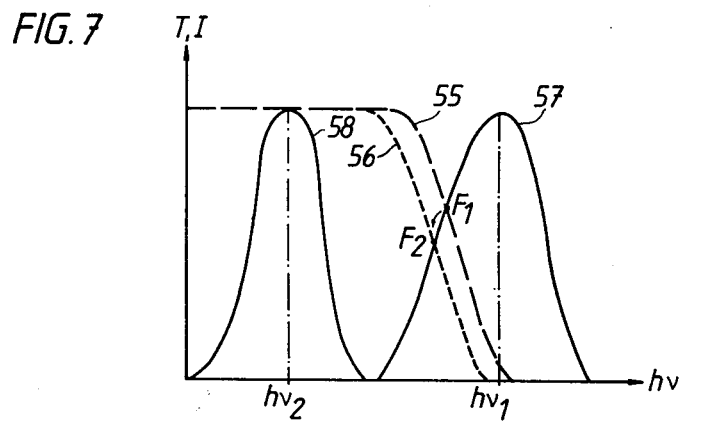
FIG. 7
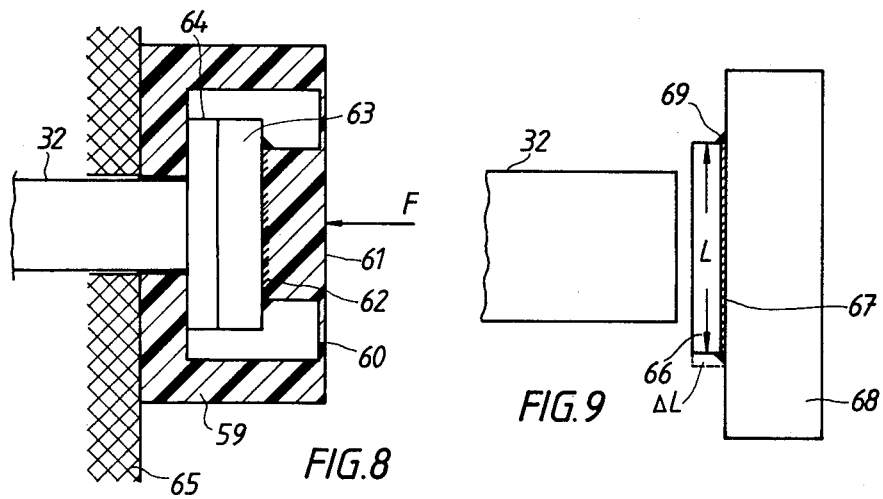
FIG. 8
FIG. 9

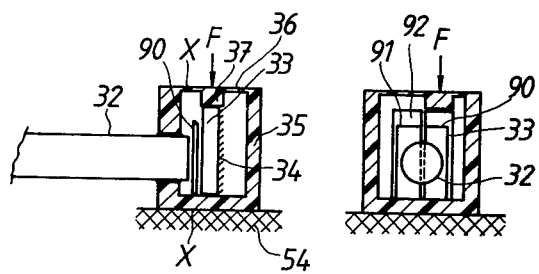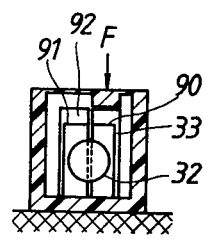
FIG. 10a  FIG. 10b
FIG. 11
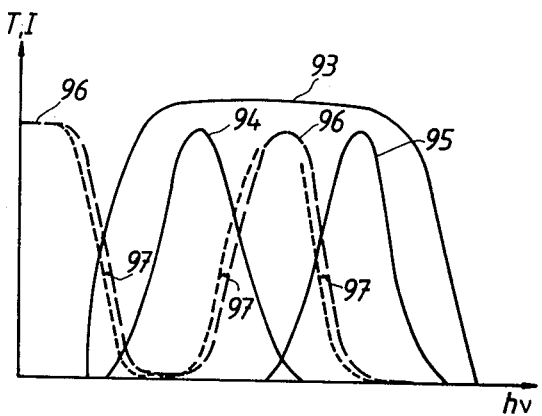
FIG. 12a  FIG. 12b
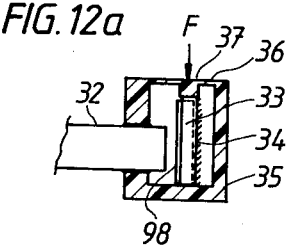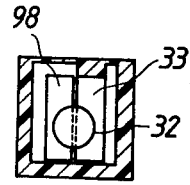

APPARATUS FOR MEASURING PRESSURE BY ABSORPTION SPECTRUM CHANGE

BACKGROUND

1. Field of the Invention

The present invention relates to a fiber optical measuring device based on spectral analysis.

2. Prior Art

It is known to use optical measuring devices for measuring physical magnitudes by using the magnitude to be measured for moving a mechanical system in space, the position of the mechanical system being sensed optically by means of light transmitted by optical fibers. A screen or the like is arranged on the mechanical system and screens off a ray of light directed towards the screen. The screened portion of the light ray is dependent on the position of the mechanical system. A sensing and evaluation of the screened portion of the light ray are used for evaluating the magnitude that has moved the screen.

The geometric-optical construction of such a measuring device results in an inevitable restriction of the measurement resolution, which limits the applicability of the measuring device when measuring very small movements.

SUMMARY OF THE INVENTION

The present invention suggests a different method for optical measurement of physical magnitudes. A measuring device comprises a transducer with a pressure cell of a material which, when subjected to a force, is subject to a change of the band gap in the light absorption spectrum, which provides a displacement of the light absorption spectrum. The alteration of the absorption spectrum with respect to the light spectrum of the used light source is a measure of the magnitude to be measured.

BRIEF DESCRIPTION OF THE FIGURES

The invention will be described with reference to the following drawings:

FIG. 6 shows a measuring device for both static and dynamic measurements;

FIG. 7 shows the function of the measuring device according to FIG. 6;

FIG. 8 shows a modified embodiment of the transducer according to FIG. 6;

FIG. 9 shows a transducer for measuring elongation;

FIGS. 10a and 10b show a two-part temperature-compensated transducer;

FIG. 11 shows the function of the temperature-compensated transducer;

FIGS. 12a and 12b show another two-part temperature-compensated transducer;

DETAILED DESCRIPTION

Figure 1:
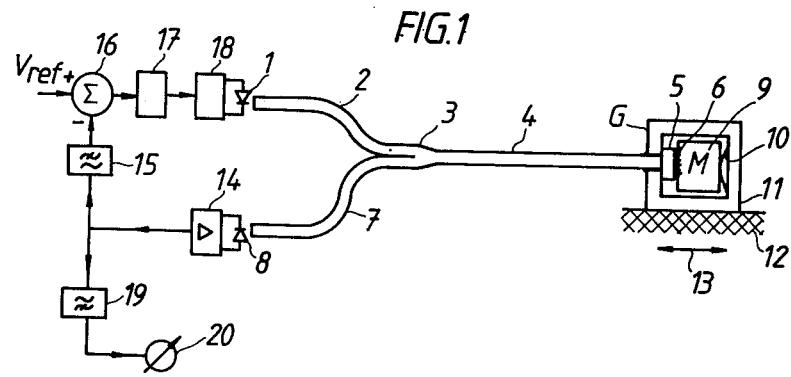
FIG. 1 shows a measuring device for dynamic measurements.

FIG. 1 shows a fiber optical accelerometer in which the movement of gravitational compound 9 is detected by pressure-sensitive modulator 5. Light from light source 1 is emitted via optical fiber 2, fiber branch 3 and fiber 4 to optical modulator 5. Behind modulator 5 is reflecting surface 6. The light that has passed through modulator 5, been reflected from reflecting surface 6, again passed through modulator 5, is conducted by fiber 4 to branch 3, where part of the reflected light is passed into fiber 7.

Compound 9 and modulator 5 are included in transducer G, which has casing 11 arranged on base plate 12. An acceleration of base 12 in the direction of arrow 13 is transmitted via casing 11 to modulator 5 and compound 9, which is pressed by spring 10 against modulator 5. Compound 9 and modulator 5 constitute a mechanical oscillating system of the second order, and for accelerations of base layer 12 at frequencies below the resonance frequency of the mechanical oscillating system, the force by which compound 9 influences modulator 5 will be proportional to the acceleration of base layer 12. In this way the transmission of light in modulator 5 depends on the acceleration of base layer 12 and the light variations in fiber 7 can be calibrated to the acceleration of base layer 12, which may also be designated the measuring object. The light from light conductor 7 is detected by photo-detector 8, the photo-current of which is amplified in amplifier 14. The output signal from amplifier 14 passes through low pass filter 15 and the output signal therefrom is compared in subtracting device 16 with reference signal $V_{ref}$. The error signal thus obtained controls regulator 17, which in turn controls drive circuit 18 for light-emitting diode 1 in such a manner that the output signal from filter 15 is maintained equal to $V_{ref}$. In this way the electronics system compensates for instabilities of the light-emitting diode, the fibers and the photo-diode. The output signal from amplifier 14 is also supplied to high-pass filter 19, the output signal of which is supplied to indicating or recording instrument 20, as the measuring signal of the measuring device. Because the measuring system is stabilized by means of low-frequency signals, it cannot be used for measuring accelerations with frequencies down to zero.

Figure 2:
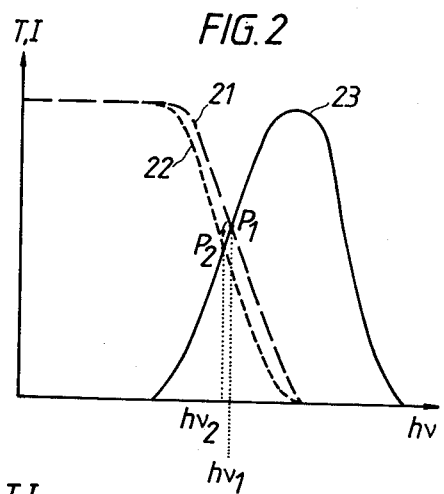
FIG. 2 shows the function of the modulator.

The function of the pressure-sensitive optical modulator will be explained with reference to FIG. 2, which partly shows transmission spectrum 21 for the modulator when it is subjected to a pressure P1, partly the same transmission spectrum 22 when the modulator is subjected to a different pressure P2, and light spectrum 23 for light source 1.

Modulator 5 consists of a semiconductor with a band gap corresponding to $h\nu_1$, where h is Planck's constant and $\nu$ the frequency of the used light. When the pressure, which acts on modulator 5, decreases from P1 to P2, the band gap decreases (about $10^{-2}$ eV/kbar), with the result that the transmission edge is displaced to the left in the Figure and the intersection with spectral distribution curve 23 of the light source is displaced from $h\nu_1$ to $h\nu_2$, which means that less light will be transmitted through modulator 5. The semiconductor material may be, for example, gallium arsenide. It should be noted that to obtain good stability the light source should be temperature-stabilized.

Figure 3:
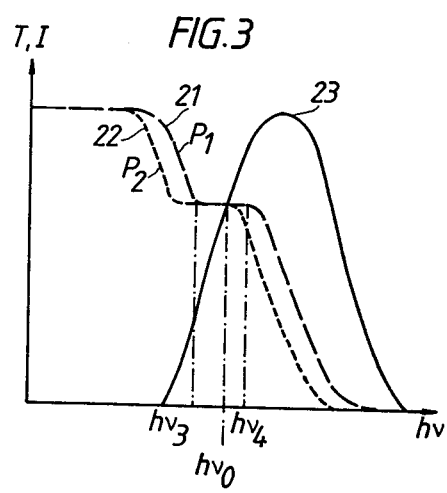
FIGS. 3–5 show the function of doped modulators.
Figure 4:
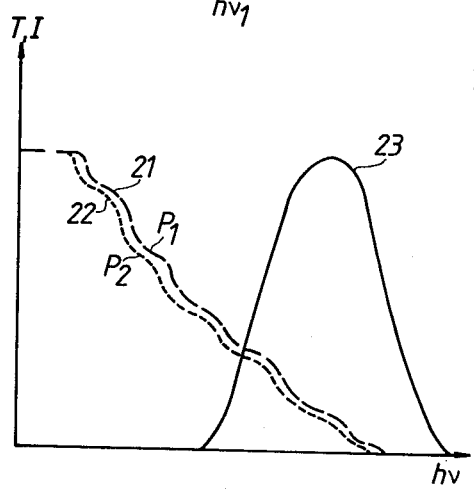
Figure 5:
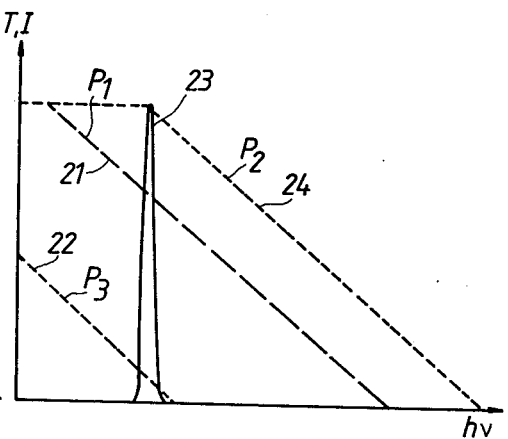

By doping the semiconductor in modulator 5, so that an interference level is obtained in the band gap, there is obtained a plateau in the transmission spectrum between $h\nu_3$ and $h\nu_4$, which results in the transducer having a zone with a lower sensitivity. This is shown in FIG. 3 for the case when the pressure drops from P1 to P2, whereby the intersection between spectrum 23 of the light source and the transmission spectrum of modulator 5 lies constant at $h\nu_0$. This possibility of doping the semiconductor can be made use of for constructing a transducer with a great linearity range, which is shown in FIG. 4. By doping modulator 5 with a number of impurities, corresponding to different interference levels in the band gap, and by controlling the concentrations of the doping, a linear relationship can be obtained between the measured quantity and the light which is transmitted by optical modulator 5. Because of the variation of the interference levels, the wave-shaped characteristic of the transmission spectrum according to FIG. 4 will be smoothed out into a straight line at only a few interference levels, as shown in FIG. 5. If a narrow-band light source is used in this connection, a linear relationship can be obtained between the movement of the absorption edge and the intensity of the light passed through modulator 5.

For measuring slowly varying processes the stabilization method according to FIG. 1 cannot be used. FIG. 6 shows a measuring device suitable for such measurements. Two oscillators 49, 51, operating at different frequencies f1, f2, control one light-emitting diode each, 25 and 26, respectively, via two drive circuits 50 and 52, respectively. Light-emitting diodes 25 and 26 emit light with different wavelengths $\lambda 1$ and $\lambda 2$, respectively, through separate fibers 27 and 28, respectively. After branch-off 29, which connects fibers 27 and 28 into a common fiber 30, two light components of different wavelengths and different modulating frequencies are obtained in fiber 30. These light components are passed via branch 31 and fiber 32 to pressure-sensitive modulator 33 and are reflected back towards fiber 32 by mirror 34. The light which penetrates into fiber 32, is conducted therein back to branch 31, where part of the light is switched via fiber 38 into photo-detector 39, the photo-current of which is amplified in amplifier 40. The output signal from amplifier 40 is divided by two band-pass filters 41, 45 into the components corresponding to light-emitting diodes 25 and 26. These components with the modulating frequencies f1 and f2, respectively, are demodulated by rectifiers 42 and 46, respectively, and low pass filters 43 and 47, respectively. The signals thus obtained are supplied to quotient former 44, at the output of which the quotient between the signals emanating from light sources 25 and 26, respectively, is obtained. The value of this quotient is not influenced by instabilities in the fiber optics and is proportional to the transmission through the optical modulator with respect to the light from light source 25 and constitutes the measured value of the measuring device, which value is supplied to instrument 48 which may be, for example, a registering instrument.

The transducer is assumed in this case to be a force transducer, consisting of transducer housing 35 which rests on base plate 54. The force F to be measured acts on block 37 and is provided with membrane 36, block 37 transmitting the force to optical modulator 33, the transmitting capacity of which is changed with the applied force.

The operation of light modulator 33 is shown from FIG. 7, in which the transmission curve of modulator 33, at the applied force F1, is designated 55, and the corresponding curve for the smaller force F2 has the designation 56. In the same way as has been explained with reference to FIG. 2, a change of the applied force F will cause the point of intersection between spectral curve 57 of light source 25 and the transmission curve of the modulator to be displaced. This results in the light from light source 25, with the wavelength $\lambda 1$ and the energy $h\nu_1$, being modulated by applied force F.

To obtain a reference signal, the frequency $\nu_2$ of light source 26 is selected such that a spectral distribution according to curve 58 is obtained which, within the range of force in question, falls entirely to the left of transmission edge 55 of the modulator. Thus, the light component which is generated by light source 26 is substantially influenced by a varying transmission of the fiber optics, and not to the same extent by a varying transmission in the transducer because of the influencing force. If an optical interference filter is placed between the fiber end and the modulator, with a suitable selection of filter, the reference light ($h\nu_2$) is reflected and the measuring light ($h\nu_1$) is transmitted, which reduces the demands on the transmission spectrum of the modulator around $h\nu_2$.

FIG. 8 shows a transducer, in which the force F to be measured is allowed to influence the optical modulator parallel to the ray path through the modulator. Casing 59 of the transducer is placed on base plate 65 which is provided with a hole for fiber 32. In the same way as is shown in FIG. 6, the force F acts through block 61, suspended from membrane 60, on optical modulator 63. Block 61 is pressed by the force F against transparent plate 64 attached to the transducer casing on the same side as fiber 32. Reflecting surface 62 is arranged between modulator 63 and block 61 to reflect the light from fiber 32 back into the fiber.

FIG. 9 shows how the optical modulator can be used in connection with an elongation gauge. Modulator 66, with applied mirror 67, is attached by adhesive 69 to body 68, the elongation of which is to be measured. An elongation $\Delta L$ of measuring distance L effects an inner tension in modulator 66, which affects the transmission of the light which is passed through modulator 66. This light is supplied and emitted through fiber 32, which does not have to be in mechanical contact with modulator 66. Such a transducer, therefore, makes it possible to measure elongation in a contact-free manner, for example on a rotating or oscillating measuring object.

The transducer shown in FIG. 9 for measuring elongation may, of course, be applied to most measuring devices, in which conventional strain gauges are used, for example for force transducers, torque transducers, pressure transducers and acceleration transducers.

Figure 13:
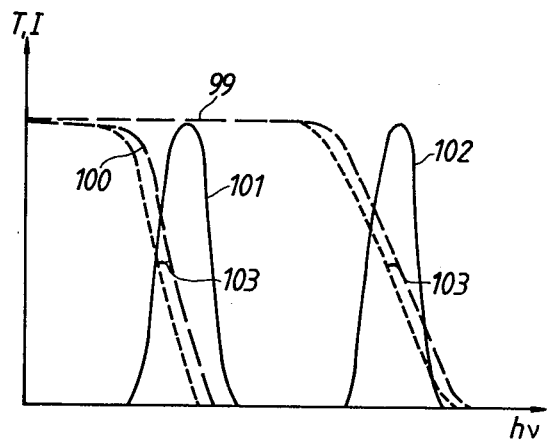
FIG. 13 shows the function of the transducer according to FIG. 12.

One problem with the use of the pressure dependency of the band gap of a material is that the band gap is also temperature-dependent. If the transducer is to be used for measuring with a high accuracy within a great temperature range, temperature stabilization is therefore required. FIGS. 10a and 10b—of which FIG. 10b is a secton along the line x—x in FIG. 10a—show a transducer with additional modulator 92, which is not influenced by the measured quantity. According to FIG. 10b the light from fiber 32 is divided into two parts, of which the right-hand part according to the Figure passes through filter 90 and modulator 33 influenced by force F, whereas the left-hand part passes through an identical arrangement with filter 91 and modulator 92 which is not influenced by the measured quantity. After reflection from mirror 34, one part of the two parts of the light returns through the modulators and the filters and into fiber 32. The mode of operation of the transducer arrangement is clear from FIG. 11, in which the spectral distribution for the light emitted from fiber 32 is designated 93, whereas 94 and 95 denote transmission spectra for the two filters 90 and 91. The transmission spectrum for modulators 33 and 92 is designated 96 and may be identical for both. Upon an increase of the temperature, the transmission curve for the modulators moves to the left according to arrows 97. As a consequence, more light returns into the fiber from the part of the transducer which has filter 90, and less light returns from the part which has filter 91. With a suitable selection of filters and modulators, temperature compensation can therefore be obtained. Instead of using a broadband light source with distribution curve 93, two narrow-band light sources can be used, which have the distribution curves 94 and 95, respectively. If two separate light sources are used, as shown in FIG. 6, a more simple transducer arrangement can be used, as shown in FIGS. 12a, 12b. The light from fiber 32 passes through dummy modulator 98, which is not subjected to the influence of the measured quantity, and modulator 33. FIG. 13 shows the operation of such a transducer, in which numerals 99 and 100 denote the transmission spectra of the measuring and the dummy modulator, respectively, and 102 and 101 respectively show the light spectrum of the measuring and the reference light. When the transducer temperature is increased, the absorption edges of both transmission spectra 99 and 100 move to the left in the Figure. As a result, the intensity of the light affected by the modulator is reduced, both with regard to the light from the light source corresponding to curve 102 and the light from the light source relating to curve 101. When forming the quotient or the difference of the two light components, which are reflected back into fiber 32, the effect of the temperature can therefore be compensated. Thus, also in this case the measuring device according to FIG. 6 can be used, if only the wavelength ranges of light sources 25 and 26 are selected such that they coincide with the absorption edges of the two modulators according to FIG. 13.

Figure 14:
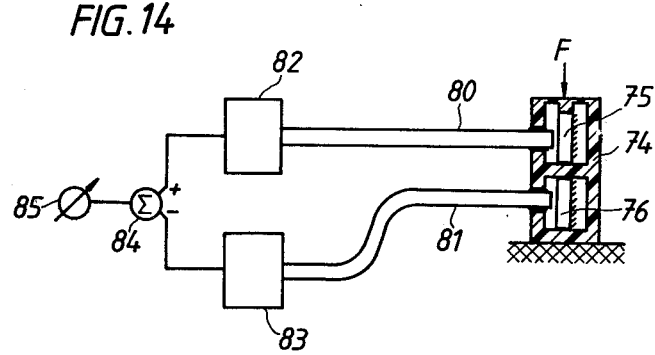
FIG. 14 shows another embodiment of a temperature-compensated transducer.

FIG. 14 shows an alternative transducer having temperature compensation. In this case transducer housing 74 is divided into two planes, measuring modulator 75 influenced by force F being arranged at the upper plane, and dummy modulator 76 uninfluenced by force F being arranged at the lower plane. The transmission through the two modulators is measured with two identical systems involving light conductors 80 and 81, respectively, and electronics units 82 and 83, respectively. The electronics units correspond to component 53 in FIG. 6. Light is conducted between unit 82 and modulator 75 in fiber 80, and between unit 83 and modulator 76 in fiber 81. The difference between the signals from units 82 and 83 is determined in subtractor 84 and its output signal constitutes a temperature-compensated measuring signal, which can be supplied to registering instrument 85. Contrary to the compensation shown in FIG. 10, modulators with the same band gaps can be used here. An increase of the temperature results in an equal reduction of the transmission in both the modulators. The difference signal emitted from subtractor 84 is therefore uninfluenced by the temperature.

Figure 15:
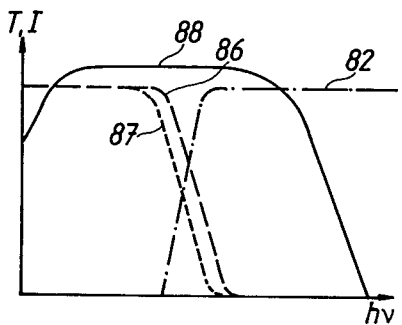
FIG. 15 shows the function of the measuring device applied to a light source with a broad spectrum and when using an optical filter.

FIG. 15 shows the operation of the transducer in the case where a light source with broad spectrum 88 is used. If the light source has a constant intensity over a wavelength range exceeding the wavelength range of absorption edge 86 of the modulator, a linear relationship is obtained between the displacement of the absorption edge and the light intensity of the light that has passed through the modulator. To obtain a linear relationship also between the measured quantity and the light intensity, a suitably chosen light source—possibly combined with a filter—may be used. In FIG. 15 filter characteristic 89 has also been shown. With the transmission curve shown, a transducer with the same function as shown in FIG. 2 is obtained. The filter may be inserted in the ray path at any location between the light source and the photo-detector in the measuring device according to FIGS. 1 and 6. To obtain the relationships as shown in FIG. 7, two filters with the transmission spectra according to curves 57 and 58 in FIG. 7 may be used. In total there are four possibilities of influencing the spectral properties of the measuring device, namely, through the choice of the light source, the filter in the ray path, the modulator and the photo-detector.

What is claimed is:

1. Optical measuring device for measuring physical parameters, comprising:
    a transducer for transforming a physical parameter to be measured into mechanical stresses in at least one modulator included in the transducer, said modulator comprising a material having optical properties dependent on said mechanical stresses;
    means for radiating said transducer with light; and
    means for measuring the optical properties of said modulator by means of light affected by said modulator, said optical properties being varied by the pressure dependency of at least one absorption edge in the light-absorption spectrum of said material.

2. Measuring device according to claim 1, further comprising optical fibers for conducting light from said means for radiating to said transducer and for conducting light affected by said transducer to said means for measuring.

3. Measuring device according to claim 1, wherein said material is crystalline or polycrystalline.

4. Measuring device according to claim 1, wherein said material is amorphous.

5. Measuring device according to claim 3, wherein said material is a semiconductor.

6. Measuring device according to claim 1, wherein said material has an electronic band gap providing an absorption edge in the same range of wavelengths as the light emitted by said means for radiating.

7. Measuring device according to claim 1, wherein said material is doped to alter the optical band gaps thereof.

8. Measuring device according to claim 1, wherein said means for radiating includes two light sources each having separate light spectra, and the light spectrum for one light source at least partly coincides with the wavelength range for the absorption edge of the modulator material, and the light spectrum of the second light source at least partly is within a wavelength range where the light absorption of said material is not affected by the measured quantity.

9. Measuring device according to claim 1, wherein said modulator is attached to the body of said transducer.

10. Measuring device according to claim 1, wherein said modulator includes two bodies, only one of which is influenced by the physical parameter to be measured and the other body is used for temperature compensation.

11. Measuring device according to claim 1, wherein said transducer includes two bodies of said material, of which only one body is influenced by the physical parameter to be measured, said means for measuring includes means for measuring the light transmission in each of the two bodies, and further comprising means for determining the difference between the two transmissions.

12. Measuring device according to claim 3, wherein said material is the same as the material of said means for radiating.

13. Measuring device according to claim 9, wherein said transducer includes means for dividing the light in said transducer into two parts; and further including a first filter through which one part of said light passes to admit wavelengths corresponding to an absorption edge of the modulator which is influenced by the physical parameter to be measured, and a second filter through which the other part of light passes to admit wavelengths corresponding to another absorption edge of the modulator which is not influenced by the physical parameter to be measured.

14. Measuring device according to claim 9, wherein said light reflected from said transducer includes two components having separate light spectra and said transducer includes first and second modulators, the light spectrum for one component at least partly coincides with the absorption edge of said first modulator which is influenced by the measured quantity, the light spectrum for the other component lies in a wavelength range where the absorption spectrum for said first modulator is not influenced by the measured quantity, and said second modulator which is not influenced by the measured quantity has an absorption edge, and both light components pass through said first and second modulators.

15. Measuring device according to claim 7, further comprising means for temperature stabilizing said means for radiating.

* * * * *